United States Patent

[11] 3,610,300

| [72] | Inventors | Cyrus E. Hoadley<br>Olla, La.;<br>Robert E. Jones, Houston, Tex. |
|---|---|---|
| [21] | Appl. No | 17,503 |
| [22] | Filed | Mar. 9, 1970 |
| [45] | Patented | Oct. 5, 1971 |
| [73] | Assignee | Youngstown Sheet and Tube Company<br>Youngstown, Ohio |

[54] LOG RECEIVER
6 Claims, 7 Drawing Figs.

[52] U.S. Cl. .................................................. 144/3 D,
144/34 E
[51] Int. Cl. ..................................................... A01g 23/02
[50] Field of Search ........................................ 144/2 Z, 3
D, 34 R, 34 E, 309 AC

[56] References Cited
UNITED STATES PATENTS

| 3,329,184 | 7/1967 | Longert | 144/3 D |
| 3,455,352 | 7/1969 | Sanders et al. | 143/46 |
| 3,491,810 | 1/1970 | Williams | 144/34 |
| 3,530,911 | 9/1970 | Hoadley et al. | 144/34 |
| 3,556,183 | 1/1971 | Busch et al. | 144/34 |

Primary Examiner—Gerald A. Dost
Attorneys— Vincent Martin, Joe E. Edwards, M H. Gay,
Alfred H Evans and Jack R. Springgate ABSTRACT: A tree-harvesting apparatus for processing trees. The apparatus moves trees through a buck shear which drops tree sections into a receiving and unloading means. The receiving and unloading means includes a depending pair of fingers held against spreading position by stops to receive sections of a tree. During the unloading of the tree sections the fingers are moved to a position outboard of the vehicle and the fingers are moved relative to each other longitudinally of the fingers to release the stops and permit the fingers to spread and discharge the load.

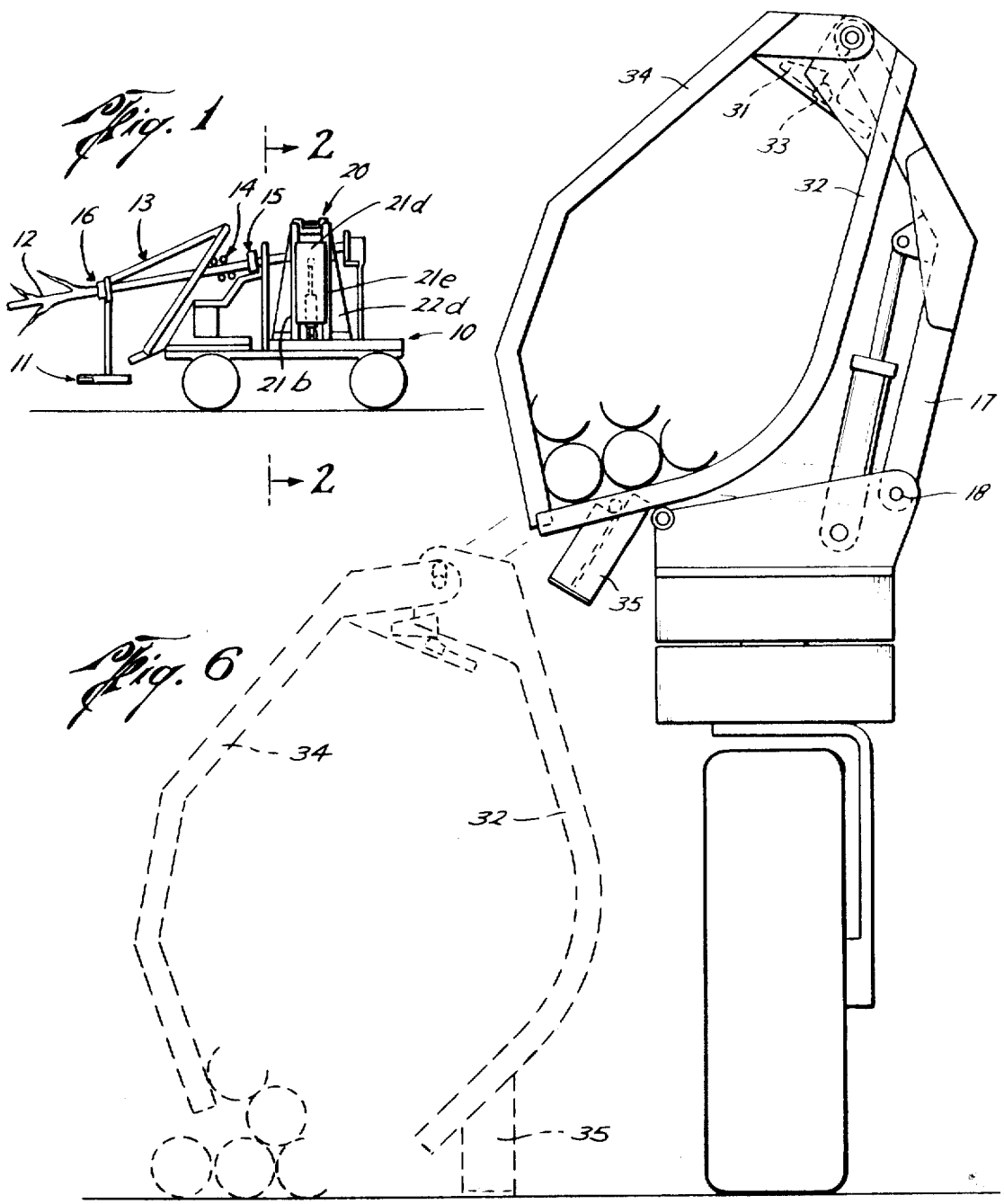

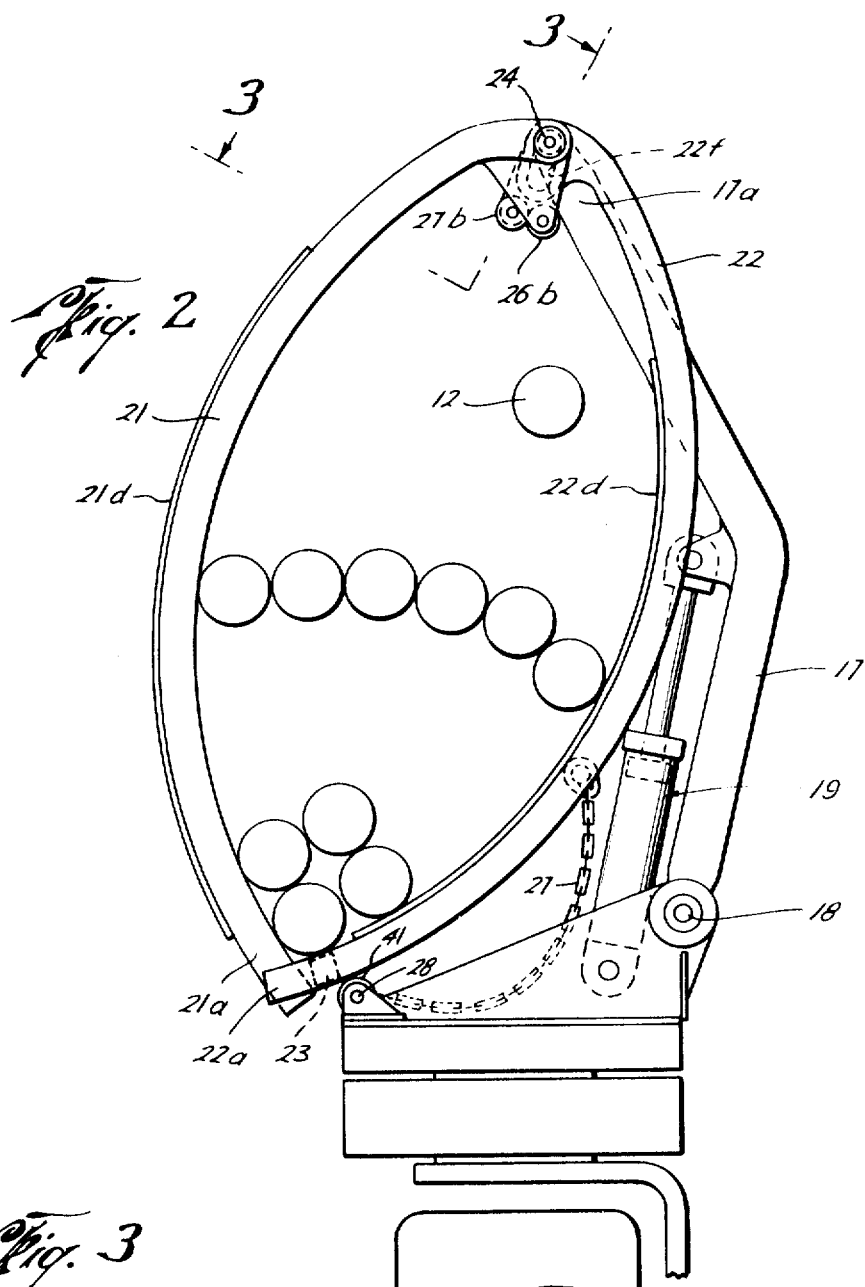
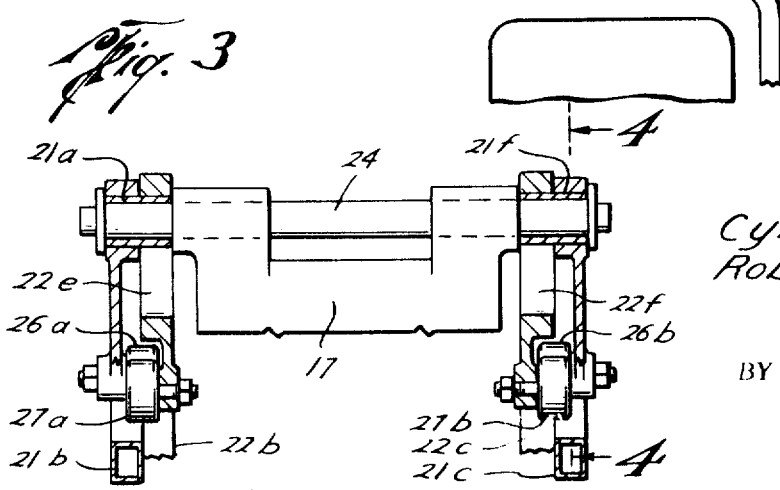

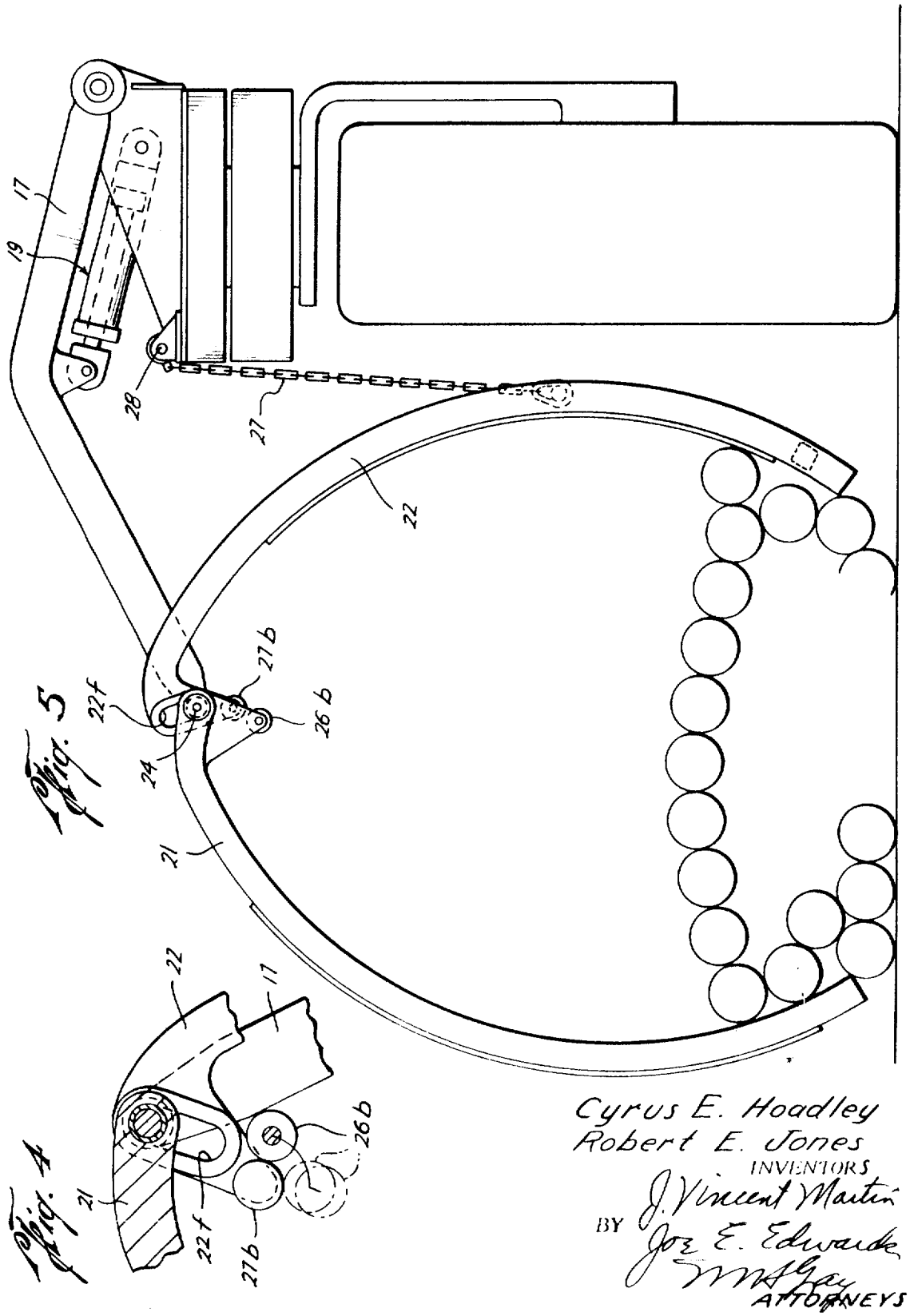

LOG RECEIVER

This invention See to a tree-processing apparatus and more particularly to a tree-processing apparatus having a wood receiving and discharging section for receiving a number of sections of wood and then discharging them in a pile. Tree harvesting apparatus having a means for receiving and depositing trees in a stack are well known. [See Busch U.S. Pat. No. 3,198,225] while the Busch patented apparatus has worked satisfactorily in practice, it requires that after a load of tree sections have been removed from the machine that a rod be threaded through the eyes of several cables which form a sling for receiving trees. This requires that the operator leave the control position and manually reconnect the ends of the cables together. In order to speed up operations, it is desirable to eliminate this step.

Accordingly it is an object of this invention to provide a tree-processing apparatus in which the receiver for three sections may be moved outboard of the vehicle to deposit the tree sections in a pile and then returned to a position for receiving additional tree sections wherein the release of the receiver to permit dumping of the tree sections and the relatching of the receiver is effected automatically by movement of the device to an unloading position and thence back to a tree-section-receiving position.

Another object is to provide a timber-harvesting apparatus with a receiver for tree sections which upon movement of the receiver to unloading position is automatically tripped to open and dump the tree sections and is automatically closed and relatched as the receiver is moved back into a tree section receiving position.

Another object is to provide a tree-harvesting machine with a receiver for receiving tree sections as they are bucked off in which fingerlike members receive the logs and are held against spreading by stops, which stops are disengaged automatically as the receiver is moved to discharge position and are automatically reengaged as the receiver is returned to tree-section-receiving position.

Other objects, features, and advantages of the invention will be apparent from the specification, the drawings, and the claims.

In the drawings wherein illustrative embodiments of this invention are shown and wherein like numerals indicate like parts;

FIG. 1 is a line drawing in side elevation of a tree harvesting apparatus constructed in accordance with this invention;

FIG. 2 is a view along the lines 2—2 of FIG. 1;

FIG. 3 is a view along the lines 3—3 of FIG. 2;

FIG. 4 is a view along the lines 4—4 of FIG. 3;

FIG. 5 is a view similar to FIG. 2 showing the tree sections being unloaded from the harvesting machine;

FIG. 6 shows an alternate form of this invention in views similar to FIGS. 2 and 5;

FIG. 7 is a fragmentary view of the device of FIG. 6.

The tree-processing apparatus shown in FIG. 1 includes a mobile vehicle indicated generally at 10 having a fell sheer indicated generally at 11 for felling a tree 12 After the tree is felled, the tree is turned and fed over the vehicle by an articulating arm indicated generally at 13. A plurality of rollers indicated generally at 14 then move the tree through the buck shear indicated generally at 15. During such movement the limbs are removed form the tree as they pass through the support device 16. As the buck shear 15 shears sections from the tree they fall into the receiving and unloading device indicated generally at 20. For a detailed description of the tree-harvesting device of FIG. 1 with the exception of the receiving and unloading means 20, reference is made to the application of Busch, et al., filed June 25, 1968, Ser. No. 739,766 and now U.S. Pat. No. 3,556,183.

Referring now to the receiving means for receiving the bucked sections and for unloading and stacking the sections, a support arm 17 has one end pivoted to the mobile vehicle at 18. The free end of the arm 17 is movable from a position over the vehicle where the receiving means receives tree sections [FIG. 2] to a position outboard of the vehicle for unloading tree sections [FIG. 5]. Suitable means such as the hydraulic motor indicated generally at 19 is provided for moving the arm 17 between its positions as shown in FIG. 2 and FIG. 5.

The receiving means includes a pair of fingers 21 and 22 which depend from the free end 17a of the arm 17. As will be noted in FIG. 2, the free ends 21a and 22a of the fingers 21 and 22 have their free ends substantially in engagement when the fingers are in closed position. The fingers are spaced apart intermediate their extremities to receive tree sections as indicated in FIG. 2. Preferably, the fingers 21 and 22 are arcuate in form as shown in FIG. 2. A suitable stop 23 may be carried by one of the fingers, such as finger 22 for engagement by finger 21 to limit closing action of the fingers.

Each finger includes a pair of spaced curved structural members joined by a curved metal plate. Thus, finger 21 includes the spaced structural members 21b and c joined by the metal plate member 22d. Plate member 22d, is inside of structural members 22b and c and has a substantial horizontal dimension at its lower extremity to guide tree sections as they are bucked off and fall into the receiver. The tree sections are bucked off at a point close to finger 22. [See FIG. 2.]

A stop is provided on each finger and the fingers are movable longitudinally relative to each other. In one relationship the stop engages to prevent spreading of the fingers so that they will support tree sections. In another relationship the fingers are moved longitudinally relative to each other to a position where the stops disengage and bypass each other to permit the fingers to spread and dump log sections.

The fingers 21 and 22 depend from the arm 17 in a manner which will permit one of the arms to swing about a pivot pin 24 at the free end of the arm 17. The other arm is free to swing about a hinge point adjacent the free end of arm 17 and is also free to move in a longitudinal or vertical direction relative to arm 17.

In the preferred form, the arm 21 is hinged about the pin 24. The hinging and longitudinal movement of arm 22 relative to the free end of arm 17 may be provided in any desired manner or by any desired type of linkage. Preferably a simple form of linkage is utilized. In the preferred form, the upper end of finger 22 is provided with a slot which receives the pin 24. This permits the arm 22 to hinge about the pin 24 and to move longitudinally relative to pin 24 within the limits provided by the slot. By reference to FIG. 3, it will be noted that the pin 24 is of considerable length as is the width of support arm 17. The structural members 21b and c are pivoted about pin 21 at 21e and 21f. The slot referred to above is actually provided by slots 22e and 22f in members 22b and c, respectively.

In order to hold the pair of fingers against spreading motion, stops are provided which engage each other when the fingers 21 and 22 depend from the pin 24. In the preferred form, stops are provided by rollers 26a and b carried on fingers 21b and c, respectively. In like manner, rollers 27a and b are carried on finger 22 and particularly on the members 22b and c, respectively. It will be noted from FIG. 2 that when both fingers 21 and and 22 depend from the pin 24, the rollers are in engagement with each other and prevent spreading of the fingers 21 and 22.

As best shown in FIG. 5, when the finger 22 is moved longitudinally upwardly relative to the arm 17 or pivot 24 the stops provided by the several rollers disengage and permit the fingers to spread.

Means are provided for limiting longitudinal movement of the finger having the slot, that is finger 22 so that further downward movement of the free end of arm 17 will result in relative longitudinal movement of the finger 22 and the pivot 24 to move the pivot point 24 downwardly relative to arm 22, that is to the bottom of slot 25 to disengage the stops provided by the several rollers, thus permitting the fingers to spread relative to each other.

Any desired means may be provided to limit longitudinal movement of one of the fingers such as finger 22 as the arm 17 moves to unloading position to disengage the stops to free the fingers to spread and dump tree sections held between the fingers. In the preferred embodiment a chain 27 connects the finger 22 to the vehicle body at 28. As best shown in FIG. 5, upon the chain being stretched to its full length, further downward movement of finger 22 is arrested while the support arm 17 continues downward movement to disengage the stops and free the fingers.

As shown in FIG. 4, after downward movement of finger 22 has ceased, further downward movement of arm 17 continues the downward movement of finger 21. This first moves the roller 26a down to the first dotted line position where it disengages roller 27a. Of course the same action occurs with the rollers on the other side of the support arm 17. Then further downward movement of finger 21 moves the roller 26a to the second dotted line position where it is free to clear roller 27a.

Upon lifting the support arm 17 with the preferred form of fingers, the rollers 26a and 26b engage the rollers 27a and 27b until the fingers clear the discharged tree sections. Then the fingers are free to close and the pin 24 to move to the upper end of slot 25 to again lock the fingers in locked position as shown in FIG. 2.

FIG. 6 shows an alternate form of the invention in which fixed stops are utilized instead of rollers. The stop 31 is carried on finger 32 and stop 33 is carried on finger 34. The same slotted support is utilized at the upper ends of the fingers.

A foot 35 is supported on the lower end of finger 32 and, as shown in the dotted line representation, upon foot 35 engaging the ground the longitudinal movement of the finger 32 is topped and further downward movement of the support 17 lowers the finger 34 to disengage the stops and permit the fingers to swing to open position.

In either form a shock absorber 36 of conventional form may be provided to slow the closing movement of the fingers. The shock absorber is shown with the form of the invention illustrated in FIG. 6. A collar 37 on shaft 38 of the shock absorber engages a spring 39 between the collar and the cylinder of the shock absorber 36 to retard closing movement of the fingers.

In operation the receiver is positioned as shown in FIG. 2 and receives tree sections being bucked off by the buck shear 15. The plate 22d provides a surface along which they slide and fall into the bottom of the receiver. AS soon as a load of wood is deposited in the receiver, it is discharged or the vehicle is driven to a point of discharge. The hydraulic motor 19 is actuated to move the receiver outboard of the vehicle as shown in FIG. 5. During such movement, the finger 22 will move along a roller 41. The chain is stretched as shown in FIG. 5, and the downward longitudinal movement of the finger 22 will stop. Further downward movement of the arm 17 will move the pivot pin 24 downwardly within the slots 22e and 22f to disengage the rollers 26a and 26b from rollers 27a and 27b, thus permitting the fingers to spread. The weight of the load of the tree sections will spread the fingers apart and discharge the tree sections. As the motor 19 is extended to pick up the receiver, the rollers 26a and 26b will be underneath the rollers 27a and 27b and both fingers will be lifted upwardly until they clear the logs being discharged. At this time the fingers will close and rollers 26a and 26b will roll past rollers 27a and 27b permitting the finger 22 to drop until the pin 24 is in the upper end of slot 25. At this time the fingers are again locked in a nonspreading position as shown in FIG. 2.

From the above it will be seen that a receiving and unloading system has been provided in which the device automatically opens upon being moved to an unloading position to discharge tree sections and upon the device being again lifted to a position to receive additional tree sections it is automatically locked in closed position. It is not necessary for the operator to personally latch the tree receiver in closed position. Thus, the tree receiver is automatically opened and closed merely by moving it between a tree section receiving position to a tree section discharging position.

While a slotted system is illustrated, it will be apparent that any desired linkage which will permit the two fingers to move relative to each other could be utilized. Rollers or stops of any desired form may be utilized to latch the fingers in closed position. Also any desired means may be utilized to limit longitudinal movement of one of the fingers so that the stops may move to disengaged position.

The foregoing disclosure and description of the invention are illustrative and explanatory thereof and various changes in the size, shape and materials, as well as in the details of the illustrated construction, may be made within the scope of the appended claims without departing from the spirit of the invention.

What is claimed is:

1. A tree-harvesting apparatus comprising:
   a mobile vehicle;
   means on said vehicle for moving a tree through a buck shear and bucking the tree into sections;
   and receiving means for receiving the bucked sections and for unloading and stacking the sections including,
   a support arm having one end pivoted to the vehicle,
   means for moving the free end of said arm from a position over the vehicle where the receiving means receives the tree sections to a position outboard of the vehicle for unloading the tree sections,
   a pair of fingers depending from the free end of said arm and having their free ends substantially in engagement when the fingers are in closed position and being spaced apart intermediate their extremities to receive the tree sections,
   one of said fingers pivoted to said arm,
   the other of said fingers carried by said arm for pivotable movement and longitudinal movement relative to said arm,
   a stop carried by each finger,
   said stops engageable to prevent spreading movement of said fingers when both fingers are dependent from said arm and moved to disengaged position upon relative longitudinal movement of said other finger relative to said arm from said dependent position to permit spreading of said fingers,
   and means limiting longitudinal movement of said other finger as said arm moves to unloading position to move the arm relative to said other finger and disengage the stops to free the fingers to spread and dump tree sections held between the fingers.

2. A tree-harvesting apparatus comprising:
   a mobile vehicle;
   means on said vehicle for moving a tree through a buck shear and bucking the tree into sections;
   and receiving means for receiving the bucked sections and for unloading and stacking the sections including,
   a support arm having one end pivoted to the vehicle,
   means for moving the free end of said arm from a position over the vehicle where the receiving means receives tree sections to a position outboard of the vehicle for unloading tree sections,
   a pair of fingers depending from the free end of said arm and having their free ends substantially in engagement when the fingers are in closed position and being spaced apart intermediate their extremities to receive tree sections,
   one of said fingers pivoted about a pivot pin carried by said arm and the other of said fingers having a longitudinal slot receiving said pivot pin to permit both pivotal and longitudinal movement relative to the arm,
   a stop carried by each finger,
   said stops engageable to prevent spreading movement of said fingers when both fingers are dependent from said pivot pin and moved to disengaged position upon relative longitudinal movement of said other finger relative to said arm from said dependent position to permit spreading of said fingers,
   and means limiting longitudinal movement of said other finger as said arm moves to unloading position to move the arm relative to said other finger and disengage the stops to free fingers to spread and dump tree sections held between the fingers.

3. The apparatus of claim 2 wherein the stops are provided by rollers mounted on the fingers.

4. The apparatus of claim 2 wherein the means for limiting longitudinal movement of said other finger is a foot member which extends below both fingers and is adapted to rest upon the ground to stop movement of said other finger.

5. The apparatus of claim 2 wherein a member interconnects said other finger and said vehicle and limits the extent of movement of said other finger toward unloading position.

6. The apparatus of claim 2 wherein said stops are provided by rollers and said means limiting movement of said other finger is a chain interconnecting said other finger and said vehicle.